United States Patent [19]

Stoll

[11] Patent Number: 5,338,005
[45] Date of Patent: Aug. 16, 1994

[54] SEALING RING FOR MULTI-WAY VALVES

[75] Inventor: Kurt Stoll, Esslingen, Fed. Rep. of Germany

[73] Assignee: Festo KG, Esslingen, Fed. Rep. of Germany

[21] Appl. No.: 111,218

[22] Filed: Aug. 24, 1993

[30] Foreign Application Priority Data

Aug. 26, 1992 [DE] Fed. Rep. of Germany ....... 4228438

[51] Int. Cl.$^5$ .............................................. F16K 31/44
[52] U.S. Cl. ................... 251/214; 277/215; 277/235 R
[58] Field of Search .................. 277/201, 215, 235 R, 277/189.5; 251/214

[56] References Cited

U.S. PATENT DOCUMENTS

| 2,844,426 | 7/1958 | Glaser .............................. 277/235 R |
| 3,017,901 | 1/1962 | Hicks, Jr. . |
| 3,106,406 | 10/1963 | Liebig .............................. 277/235 R |
| 3,180,650 | 4/1965 | Liebig .............................. 277/235 R |
| 3,214,182 | 10/1965 | Herbruggen ......................... 277/215 |
| 3,472,523 | 10/1969 | Rentschler et al. . |
| 3,603,602 | 9/1971 | Padula . |
| 3,865,386 | 2/1975 | Wilke . |
| 3,927,891 | 12/1975 | Larker et al. ..................... 277/235 R |
| 3,968,971 | 7/1976 | Mariaulle . |
| 4,240,467 | 12/1980 | Blatt et al. . |
| 4,428,588 | 1/1984 | Oelke . |
| 4,681,326 | 7/1987 | Kubo .............................. 277/215 |
| 4,824,125 | 4/1989 | Eiermann ......................... 277/215 |
| 4,892,287 | 1/1990 | Weevers . |
| 5,139,274 | 8/1992 | Osemann . |
| 5,171,025 | 12/1992 | Stoll et al. . |
| 5,172,727 | 12/1992 | Stoll et al. . |

FOREIGN PATENT DOCUMENTS

| 0414298 | 2/1991 | European Pat. Off. . |
| 0475070 | 3/1992 | European Pat. Off. . |
| 1086094 | 7/1960 | Fed. Rep. of Germany . |
| 1953437 | 9/1966 | Fed. Rep. of Germany . |
| 7103820 | 2/1972 | Fed. Rep. of Germany . |
| 2420483 | 12/1974 | Fed. Rep. of Germany . |
| 2513982 | 10/1975 | Fed. Rep. of Germany ... 277/235 R |
| 3703360 | 8/1988 | Fed. Rep. of Germany . |
| 3920475 | 1/1991 | Fed. Rep. of Germany . |
| 2234811 | 1/1975 | France . |
| 2620784 | 3/1989 | France . |
| 473339 | 5/1969 | Switzerland . |
| 931956 | 7/1963 | United Kingdom . |

Primary Examiner—A. Michael Chambers
Attorney, Agent, or Firm—Hoffmann & Baron

[57] ABSTRACT

A sealing ring for multi-way valves comprising a valve housing and a valve spool able to be moved axially in translation therein. The ring comprises an annular sealing body which possesses radially to the outside possesses a circumferentially extending outer sealing portion for the anchoring thereof in a holding groove or recess and radially to the inside has a circumferentially extending inner sealing portion for providing a sealing action between it and the valve spool surrounded by it, while between the two portions there is a concentric central section. There is a provision for the possibility of axial motion of the inner sealing portion of the part, which is nearer to the valve spool, and furthermore a supporting and stiffening ring is present which is manufactured of a material harder than the material of the sealing body and preferably in a setting, as seen in the radial direction, outside the pivot axis with a coaxial arrangement in the sealing body.

15 Claims, 1 Drawing Sheet

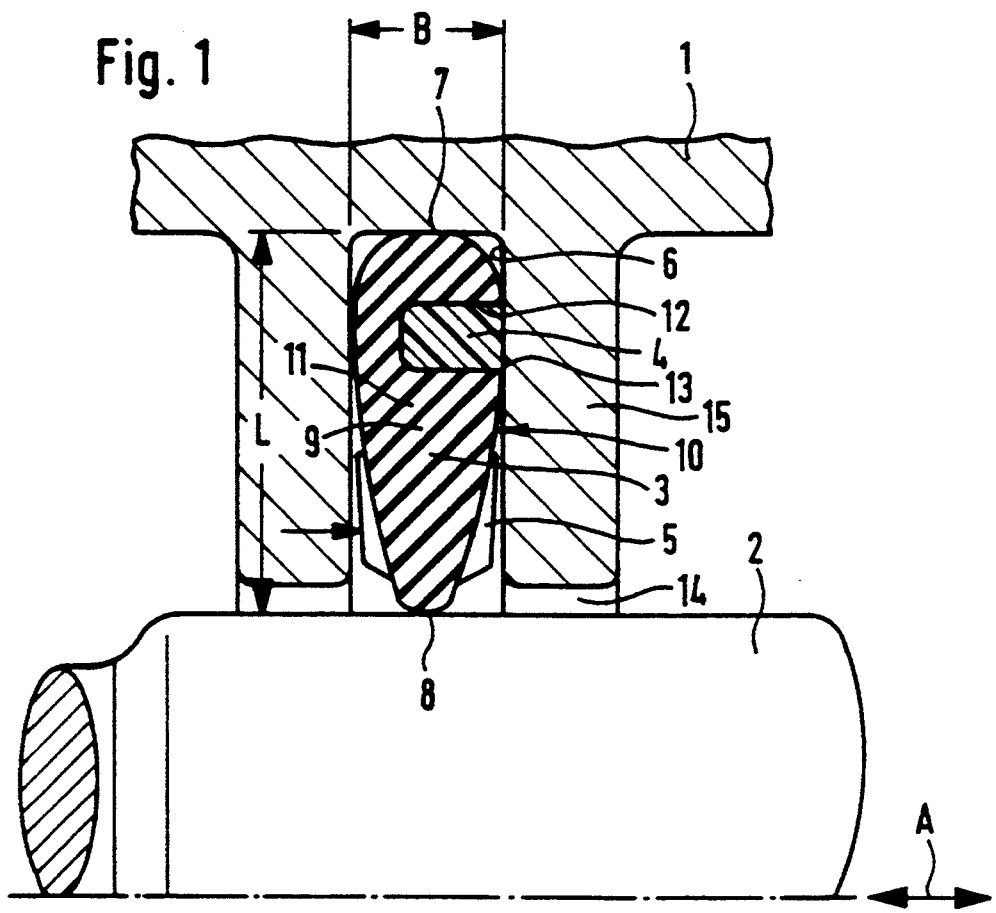
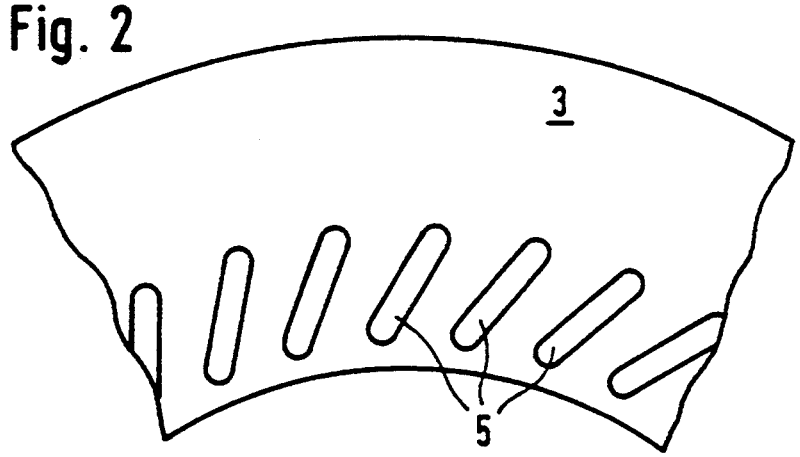

SEALING RING FOR MULTI-WAY VALVES

BACKGROUND OF THE INVENTION

The invention relates to a sealing ring for multi-way valves made up of a valve housing and of a valve spool able to be slid in the same axially, comprising an annular sealing body of a material with rubber-elastic properties which radially externally possesses a circumferential outer sealing portion serving for the anchoring thereof in a holding groove or recess in the valve housing, and radially internally possesses a circumferential inner sealing portion serving for sealing against the valve spool surrounded by it, and between the outer sealing portion and the inner sealing portion possesses a concentrically circumferential central portion.

Multi-way valves possess a valve housing with a receiving space for a piston-like valve spool designed with a round outer form, in which respect for providing a sealing action between the valve housing and the valve spool sealing rings are utilized concentrically surrounding the valve spool and secured in holding recesses in the valve housing. In the case of known arrangements of the type in question it is not unlikely, more particularly an if extremely soft and elastic material is employed for the sealing body, for the sealing portion to seize on the valve spool. This may lead to damage to the sealing portion. Furthermore in some cases the sealing ring may be pulled out of the associated holding recess. A further point to be considered is that extremely soft sealing rings are not inherently suitable for robotized assembly and they may not be employed in conjunction with robots, because they do not possess any definite form. On the other hand it is desirable to produce the best possible sealing effect, for which purpose extremely soft elastic materials come to be used for the sealing body.

SHORT SUMMARY OF THE INVENTION

Taking this prior art into account one object of the invention is to avoid the disadvantages described in above and to provide a sealing ring with the already mentioned features which not only ensures an extremely satisfactory sealing action but furthermore bans the danger of destruction of the sealing portion by seizing or sticking of the sealing portion, for example after not being used for a prolonged period of time.

A still further object of the invention is to provide a sealing ring which is satisfactory for robotized assembly.

In order to achieve these and/or other objects appearing from the present specification, claims and drawings, in the present invention a new arrangement is obtained such that the part of the sealing body adjacent to the valve spool and more particularly the inner sealing part thereof is able to be moved axially or, respectively, in the longitudinal direction of the valve spool so that it performs a sort of pivoting movement about a pivot axis in its central portion and generally perpendicular to the longitudinal axis of the ring and furthermore a supporting and stiffening ring of a material which is harder than the material of the sealing body is embedded, preferably with a setting which as seen in the radial direction is clear of the pivot axis and with a coaxial alignment inside the sealing body. It is convenient in this respect if the supporting and stiffening ring is able to ensure that the outer part of the sealing body has different properties as regards snug engagement than the part on the valve spool, the setting for example of the supporting and stiffening ring being able to be so selected in the radial direction that the elastic deformation stroke of the sealing body away from the supporting and stiffening ring towards the valve spool is essentially separated from the deformation stroke away from the supporting and stiffening ring in an outward direction. The arrangement may for example be so designed that as seen in cross section the sealing body possesses the configuration of a wedge or pear which tapers towards the valve spool, it being advantageous if the cross section of the sealing body becomes gradually wider from the outer sealing portion towards the central section in order then to gradually become narrower towards the inner sealing portion. In this respect it is more particularly an advantage if the stiffness of the material of the supporting and stiffening ring is at least five times as great as that of the material of the sealing body. The supporting and stiffening ring can be completely surrounded by the material of the sealing body or it may for example also be mounted in an annular recess, open outwards along its periphery, of the sealing body. It is more especially an advantage in this respect if on its outer surface facing the lateral walls of the holding groove or recess in the valve housing the sealing body possesses an array of fine rib-like ridges, which prevent the sealing body from coming into full snug engagement with the lateral wall of the holding groove or recess under the pressure of the fluid.

It is now possible for the designer to utilize extremely soft elastic materials for the sealing body without any sacrifices as regards the trueness to shape of the sealing ring so that, more particularly if there is an embedded supporting and stiffening ring, the ring always maintains its configuration which is suitable for robotized assembly. The supporting and stiffening ring furthermore ensures that the sealing ring is reliably held in the holding recess of a multi-way valve in an anchored state, even if owing to a pulling effect caused by seizing on the valve spool there are significant tension forces. The inclination to seize experienced with soft material does not have a negative effect on the nature of the sealing portion, because the latter, as mentioned, can be pivoted about in the range of pivot laterally to a slight degree. This portion is consequently simultaneously pivoted out of position as the valve spool starts to move, it gently running up on the surface of the valve spool so that there is a gentle separation following any seizing of the same. Without any danger of damage it is therefore possible to obtain an improved sealing action. Owing to the stiffening effect the sealing ring in accordance with the invention is able to be employed more especially in connection with such valves as have a valve housing which is transversely divided through the holding recess or in the case of which the holding recesses are arranged between annular or sleeve-like bodies arranged in axial succession. It is more particularly advantageous however to utilize the novel sealing body in conjunction with a multiway valve having a longitudinally divided valve housing so that when the housing parts are separated from one another each of such housing parts has one peripheral part of a respective holding recess. In this case each respective holding recess is opened up on opening the valve housing along a section of its periphery and more particularly along a half section so that the sealing ring may be inserted without any problems.

Further advantageous developments and convenient forms of the invention will be understood from the following detailed descriptive disclosure of one embodiment thereof in conjunction with the accompanying drawing.

LIST OF THE SEVERAL VIEWS OF THE FIGURES

FIG. 1 shows part of one embodiment of the invention in the form of a longitudinal section.

FIG. 2 shows the arrangement in accordance with FIG. 1 from the side and diagrammatically.

DETAILED ACCOUNT OF WORKING EMBODIMENT OF THE INVENTION

In the case of the embodiment of the invention depicted in the drawing the sealing ring in accordance with the invention is to be seen in conjunction with a multi-way valve, which possesses a valve housing 1, in the interior of which a receiving space is present in a known manner and in which a valve spool 2, designed in the form of a piston, is able to be reciprocated in the axial direction as indicated by the arrow A. The valve spool 2 bears an annularly shaped sealing body 10 of a material with rubber-elastic properties, which surrounds the same and possesses a surrounding, outer sealing portion 7, a surrounding or circumferentially extending, inner sealing portion 8, and between the same a central section 9. The outer sealing portion 7 functions for anchoring the sealing rings and is for this purpose set in a holding groove or recess 6 and furthermore has the function of preventing fluid flowing between the sealing ring and the valve housing in the axial direction. Generally it will have a bead-like sealing projection provided on the radially outer edge, said projection being in contact with the floor of the recess. The inner sealing portion 8 serves to seal against valve spool 2 surrounded by it, against which its front crowned terminal part rests.

In a known fashion the valve spool bears a plurality of sealing rings and it may be reciprocated inside the housing under the action of the fluid under pressure so that in this manner the various inlet and outlet ports may be joined up and separated from each other to define various flow paths for the fluid. All these features are familiar in the art so that further explanations are not called for in this respect. The inner sealing portion, the outer sealing portion and the central section are concentric and constitute in common the sealing ring, which surrounds the valve spool. (In the drawing only the respective upper half of the valve spool and of the sealing ring as well as a part of the housing is illustrated.)

In accordance with the invention there is the provision that the sealing body 10 has a supporting and stiffening ring 4 embedded therein which is manufactured of a harder material than the material of which the sealing body consists. It is also arranged coaxially in relation to the sealing ring and the valve spool. The stiffness or rigidity of the material of the supporting and stiffening ring is in this respect at least five times that of the material, of which the sealing body is produced and preferably the supporting and stiffening ring is manufactured of hard synthetic resin. The setting of the supporting and stiffening ring in the radial direction is so selected that the elastic deformation stroke of the supporting and stiffening ring towards valve spool is substantially separate from the deformation stroke of the supporting and stiffening ring in the outward direction.

The supporting and stiffening ring is in this respect responsible for ensuring that the outer part of the sealing body 10 is different as regards is snug engagement properties against the lateral wall of the holding groove or holding recess in the valve housing than the properties of the valve spool-like part.

The arrangement is furthermore so designed that the part, which is nearer to the valve spool, of the sealing body 10 and in this connection its inner sealing portion 8 may be moved in the longitudinal direction of the spool in relation to the rest of the sealing body so that it performs a sort of pivoting movement about a pivot axis in its central portion and generally perpendicular to the longitudinal axis of the ring. Therefore there is the possibility of pivotal play of the sealing ring adjacent to valve spool and inside the holding groove or recess accommodating the same so that the surface of the sealing portion practically rolls over the surface of the valve spool with the result that any strong adherence or seizing, particularly after a long period of nonuse, will be overcome. Simultaneously it is possible furthermore for the valve spool to be moved despite the adherent sealing portion so that it will already have a certain momentum, when pivotal motion of the sealing portion is arrested because the sealing portion runs up against the associated flank or side wall. The momentum so far it is possible for the valve spool to be freed from adherent engagement with the sealing portion without any problems, something which would hardly be possible in the case of a rigidly set sealing body. In this case be it would in certain cases hard to get the valve to move at all.

As shown in the drawings, the sealing body 10 has in cross section the configuration of a wedge or pear, which tapers towards the valve spool 2, it being convenient in this respect if the cross section of the sealing body 7 gradually becomes broader from the outer sealing portion 7 towards the central section 9 in order then to gradually become narrower as far as the inner sealing portion 8. It is particularly advantageous if there is a relationship, as seen in the cross section of the sealing body, between the maximum width B of the wedge 10 and the maximum length of such wedge of 1:2.0 to 1:3.5. It is furthermore to be seen from the drawing that on its outer surfaces facing the lateral walls of the holding groove or recess, the sealing body possesses an array of fine rib-like ridges, 5, which prevent the sealing body 10 from coming into full snug engagement with the lateral wall of the holding groove or recess 6 under the pressure of the fluid. These rib-like ridge, 5, as will be more especially clearly seen in FIG. 2, may extend obliquely to the axis and be parallel to one another, such recesses preferably being provided in the portion, present between the supporting and stiffening ring 4 and the valve spool 2, of the outer surface of the sealing body. It will hence be seen that the portion adjacent to the spool of the sealing rings is able to be moved axially in the rigid holding groove or recess which accommodates it, the snug wall engagement being avoided by the already mentioned array of fine projections or ribs on the surfaces, facing the lateral walls of the holding groove or recess, on the surfaces of the sealing ring is avoided. The design in accordance with the invention of the sealing ring hence reduces the initial stress, arising in the case of inaccuracy in manufacture, and variations therein, renders possible larger tolerances than those in the case of known sealing ring design (for instance O-ring seals) and therefore improves the prospects of a qualitatively better valve function. The length of life of such seals increases, in accordance with experience, with a decrease in the snug engagement forces. Owing to the behavior as described such seals are more especially suitable for incorporation along the spool axis in divided valve housings, which adjacent to the join between the two housing parts require a locating and a sealing effect, which is furthermore able to allow for small inaccuracies.

In the illustrated working embodiment of the invention the supporting and stiffening ring 4 is received in an annular receiving space 12 in the sealing body 10, which along its circumference is open to the outside, it being convenient if the outer surface of the supporting and stiffening ring 4 mounted in this annular receiving space 12 is flush with the outer surface, coming to any end at the receiving space 12, of the sealing body 10. It is furthermore to be seen that the surrounding or circumferentially extending opening 13 of the receiving space 12 is axially directed, that is to say in the longitudinal direction of the valve spool or in other words is arranged to extend in parallelism the axis thereof. It is possible to press the supporting and stiffening ring into position or furthermore it can be bonded or snapped into it to be firmly retained in position, that is to say fixedly locate it in position. The stiffening ring may furthermore have material of the sealing body molded around it. It is possible to surround the supporting and stiffening ring 4 with material of the sealing body completely. Owing to the yielding properties of the sealing body as such (which is manufactured of soft material) the sealing portion 8 will come into snug engagement with the peripheral surface of the valve spool so that when there is an axial displacement of the valve spool there will be a tendency for the sealing ring to be bodily pulled over the opening 14 between the valve spool and the lateral wall 15 of the holding groove or recess 6. In this respect the supporting and stiffening ring 4 particularly has a counteracting effect, which is embedded in the sealing ring and consists of harder material than the remaining parts of the sealing body so that it is hardly or not at all able to be compressed. The result of this is that the sealing body 10 will always maintain its correct setting in the holding groove or recess 6.

I claim:

1. A sealing ring for a multi-way valve, the multi-way valve having a valve housing and a valve spool axially movably received in the valve housing, the sealing ring in a mounted condition thereof being arranged in a holding recess of the valve housing and surrounding the valve spool, the sealing ring comprising an annular sealing body of an elastic material, said sealing body having a radially outwardly directed annular outer sealing portion for sealing engagement with an inner surface of the holding recess and having a radially inwardly directed annular inner sealing portion for sealing engagement with the valve spool, a supporting and stiffening ring being at least partly embedded in the sealing body and being of a material which is harder than the material of the sealing body, wherein a portion of the sealing body which is arranged radially inwardly of the supporting and stiffening ring and which comprises the inner sealing portion is arranged with axial clearance in the holding recess in the mounted condition of the sealing ring and is axially pivotable with regard to the outer sealing portion of the sealing body in said holding recess, and wherein a plurality of ridges are provided on lateral surfaces of the axially pivotable portion of the sealing body for limiting the pivoting movement of the said portion by coacting with lateral surfaces of the holding recess.

2. The sealing ring as claimed in claim 1, wherein the supporting and stiffening ring is adapted to ensure that the outer part of the sealing body has different snug engagement properties in relation to the lateral walls of the holding groove or recess receiving it than the part on the valve spool.

3. The sealing ring as claimed in claim 1, wherein the setting of the supporting and stiffening ring in the radial direction is so selected that the elastic deformation stroke of the sealing body away from the supporting and stiffening ring towards the valve spool is essentially separated from the deformation stroke of the sealing body outwards away from the said ring.

4. The sealing ring as claimed in claim 1, wherein in cross section the sealing body has the form of a wedge or a pear, which tapers towards the valve spool.

5. The sealing ring as claimed in claim 4 wherein the cross section of the sealing body becomes gradually wider from the outer sealing portion towards the central section and then gradually becomes narrower as far as the inner sealing portion.

6. The sealing ring as claimed in claim 4 wherein as seen in the cross section of the sealing body, there is a relationship between the maximum width of the sealing body and the maximum length of such sealing body of 1:2.0 to 1:3.5.

7. The sealing ring as claimed in claim 1 wherein the supporting and stiffening ring is completely surrounded by material of the sealing body.

8. The sealing ring as claimed in claim 1 wherein the supporting and stiffening ring is seated in an annular receiving space, which is open along periphery to the outside, in the sealing body.

9. The sealing ring as claimed in claim 8 wherein the outer surface of the supporting and stiffening ring, which is seated in the annular receiving space, is flush with the outer surface, adjoining the receiving space, of the sealing body.

10. The sealing ring as claimed in claim 8 wherein the circumferentially extending opening of the annular receiving space is axially directed.

11. The sealing ring as claimed in claim 1 wherein the ridges extend obliquely in relation to the axis and are parallel to one another.

12. The sealing ring as claimed in claim 1 wherein the ridges are provided on an outer surface of the ring present between the supporting and stiffening ring and the valve spool.

13. The sealing ring as claimed in claim 1, wherein the supporting and stiffening ring is surrounded by molded material of the sealing body.

14. The sealing ring as claimed in claim 1 wherein the rigidity of the material of the supporting and stiffening ring is at least five times that of the material of which the sealing body is produced.

15. The sealing ring as claimed in claim 1 wherein the supporting and stiffening ring consists of hard synthetic resin.

* * * * *